(12) United States Patent
Liou

(10) Patent No.: US 6,229,780 B1
(45) Date of Patent: May 8, 2001

(54) CASE MOUNTING FOR EXTERNAL SUSPENDING CD DRIVE

(75) Inventor: Dong-Yih Liou, ChungLi (TW)

(73) Assignee: Acer Peripherals, Inc., TaoYuan (TW)

( * ) Notice: Subject to any disclaimer, the term of this patent is extended or adjusted under 35 U.S.C. 154(b) by 0 days.

(21) Appl. No.: 09/267,625

(22) Filed: Mar. 15, 1999

(30) Foreign Application Priority Data

Sep. 30, 1998 (TW) .................................................. 87216169

(51) Int. Cl.⁷ .................................................. G11B 33/02
(52) U.S. Cl. .................................................. 369/75.1
(58) Field of Search .................................................. 369/75.1–77.2; 360/97.02

(56) References Cited

U.S. PATENT DOCUMENTS

| | | | |
|---|---|---|---|
| 4,491,888 | * | 1/1985 | Brown et al. ........................ 360/97.03 |
| 4,647,998 | * | 3/1987 | Onohara et al. ........................ 360/105 |
| 4,812,932 | * | 3/1989 | Hishinuma et al. ........................ 360/97.01 |
| 4,937,806 | * | 6/1990 | Babson et al. ........................ 369/75.1 |
| 5,337,998 | * | 8/1994 | Nemoto ........................ 248/634 |
| 5,595,430 | * | 1/1997 | Weyeneth ........................ 312/319.1 |
| 5,598,306 | * | 1/1997 | Frees et al. ........................ 360/97.02 |
| 5,875,067 | * | 2/1999 | Morris et al. ........................ 360/97.01 |
| 6,002,658 | * | 12/1999 | Aso et al. ........................ 369/75.1 |

* cited by examiner

*Primary Examiner*—William Klimowicz
(74) *Attorney, Agent, or Firm*—Dougherty & Troxell

(57) ABSTRACT

A case bordering structure for externally suspending a CD drive located at an inside wall of two lateral boards of the case for preventing an optical disk processing unit from swaying rearward. It includes a pair of stopping flanges and stoppers. Each flange respectively extends from the lateral board toward the interior of the case for engaging with a rear side of the optical disk processing unit. Each stopper is formed as a bulge adjacent to a rear end of the stopping flange for reinforcement of the stopping flange. The stopping flange and the stopper are integrally and unitarily formed with the case. The case bordering structure for externally suspending a CD drive in accordance with the present invention has a small number of components and may be produced with high yield at low cost.

3 Claims, 3 Drawing Sheets

CASE MOUNTING FOR EXTERNAL SUSPENDING CD DRIVE

BACKGROUND OF THE INVENTION

1. Field of the Invention

This invention relates to a case mounting for an external suspending CD drive and more particularly to a mounting that is integrally formed with the casing of the CD drive.

2. Description of the Prior Art

Conventional externally suspended CD drives, such as the one shown in FIG. 1, mainly include an upper case 10, an optical disk processing unit 20, a circuit board 30 and a lower case 40. The upper case 10 and the lower case 40 form an accommodation space in between to house both the optical disk processing unit 20 and the circuit board 30. The optical disk processing unit 20 receives an optical disk 50 from a lateral side thereof through a slot on a side wall (not shown in the figure) of the CD drive, and equipped with the necessary circuits to perform read and/or write functions. The read/write function upon the optical disk 50 is a process requiring high precision. Hence, one of the main technical issues for such a CD drive is to isolate the optical disk processing unit 20 from external shock, and to diminish motor vibration as well.

In order to enhance operational accuracy of the optical disk processing unit 20, to properly hold the optical disk processing unit 20 in the CD drive and to reduce the influence of external shock, a conventional CD drive has four shock-absorbing rubbers 102 hanging independently in the interior of the upper case 10. Such a type of CD drive is commercially called an external suspending CD drive. On opposing lateral sides 106 of the upper case 10, there are provided with four mounting devices 60. Each of the mounting devices 60 has a bracket 605 bending inward from the lateral side 106 and thereby holding a shock-absorbing rubber 102. The shock-absorbing rubber 102 has an upper end engaging with the optical disk processing unit 20 and a free lower end to keep the circuit board 20 from colliding with the optical disk processing unit 20. The rubber 20 may absorb or reduce shock, to steadily hold the optical disk processing unit 20. It happens that, during transportation or carrying of the CD drive, any movement, particularly lateral movement, gives rise to huge sideward motion of the optical disk processing unit 20 and may result in damage of the CD drive.

In order to solve the problem mentioned above, a new technique has been developed as shown in FIG. 2. At a corresponding position on each inside wall of each lateral side 106' and close to an adjacent rear side 104', a stopping flange 601 is provided. Each stopping flange 601 is held at an angle, preferably ninety degrees, against the bracket k605;. There is further a stopper 603 to hold against the stopping flange 601. Both the stopping flange 601 and the stopper 603 are riveted or screwed to the lateral sides 106' for preventing the optical disk processing unit 20 from moving rearwardly. While such a design helps to hold the CD drive steady during transportation and/or carrying, it requires more components and more assembly work, so that cost of production is increased.

SUMMARY OF THE INVENTION

In view of the aforesaid disadvantages, it is therefore an object of this invention to provide a case mounting for a CD drive that is integrally formed with the casing so that it can be produced simply, and at low cost.

It is another object of this invention to provide a mounting for a CD drive that is integrally produced with the CD casing for achieving higher quality.

The mounting according to this invention includes a stopping flange and a stopper located on an inside wall of a lateral side of the CD casing for preventing the optical disk processing unit from moving rearwardly. The mounting is integrally formed with the casing in one piece so that it may be made with fewer components at lower cost and higher quality.

The stopping flange, which is a protrusive flange extending inward from a lateral side of the CD casing, makes contact with the optical disk processing unit, so that the optical disk processing unit cannot move rearwardly to collide with the rear wall of the casing upon external forcing. In one embodiment of the present invention, the stopping flange is bent, preferably 90 degrees, from an end of a bracket formed from the lateral side.

The stopper in accordance with the present invention is a protrusive bulge formed in the lateral side, for preventing the stopping flange from deforming under external force. In a preferred embodiment, mountings are provided at two opposite lateral sides for holding the optical disk processing unit at two sides. The stopper acts as a reinforcement member.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

The case mounting for an externally suspended CD drive according to this invention is located at an inside wall of a lateral side of the CD case for preventing the optical disk processing unit from swaying rearward. This invention is integrally formed with the CD case for reducing component numbers and lowering production cost.

Figure 1:
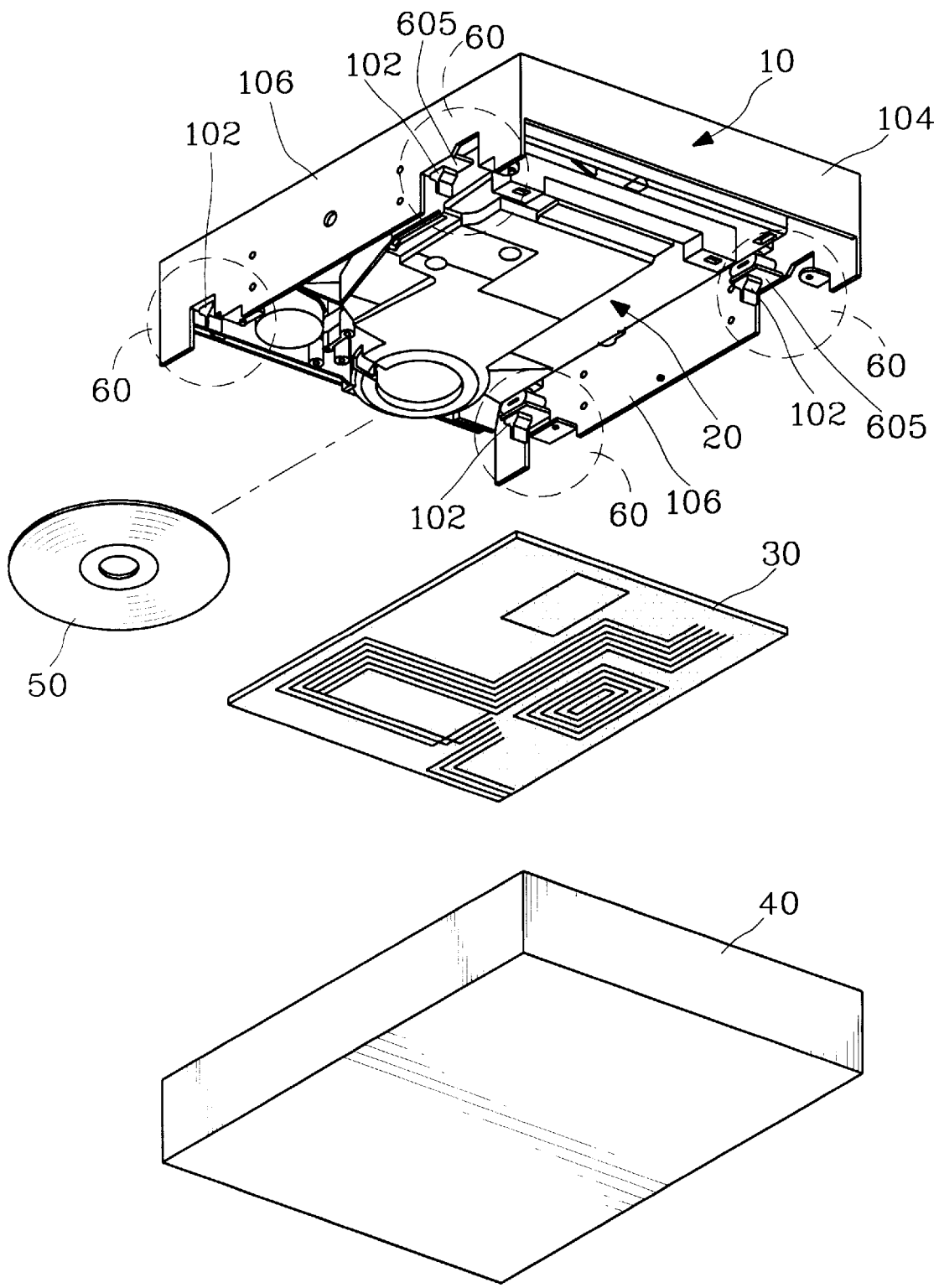
FIG. 1 is an exploded view of a conventional external suspending CD drive.
Figure 2:
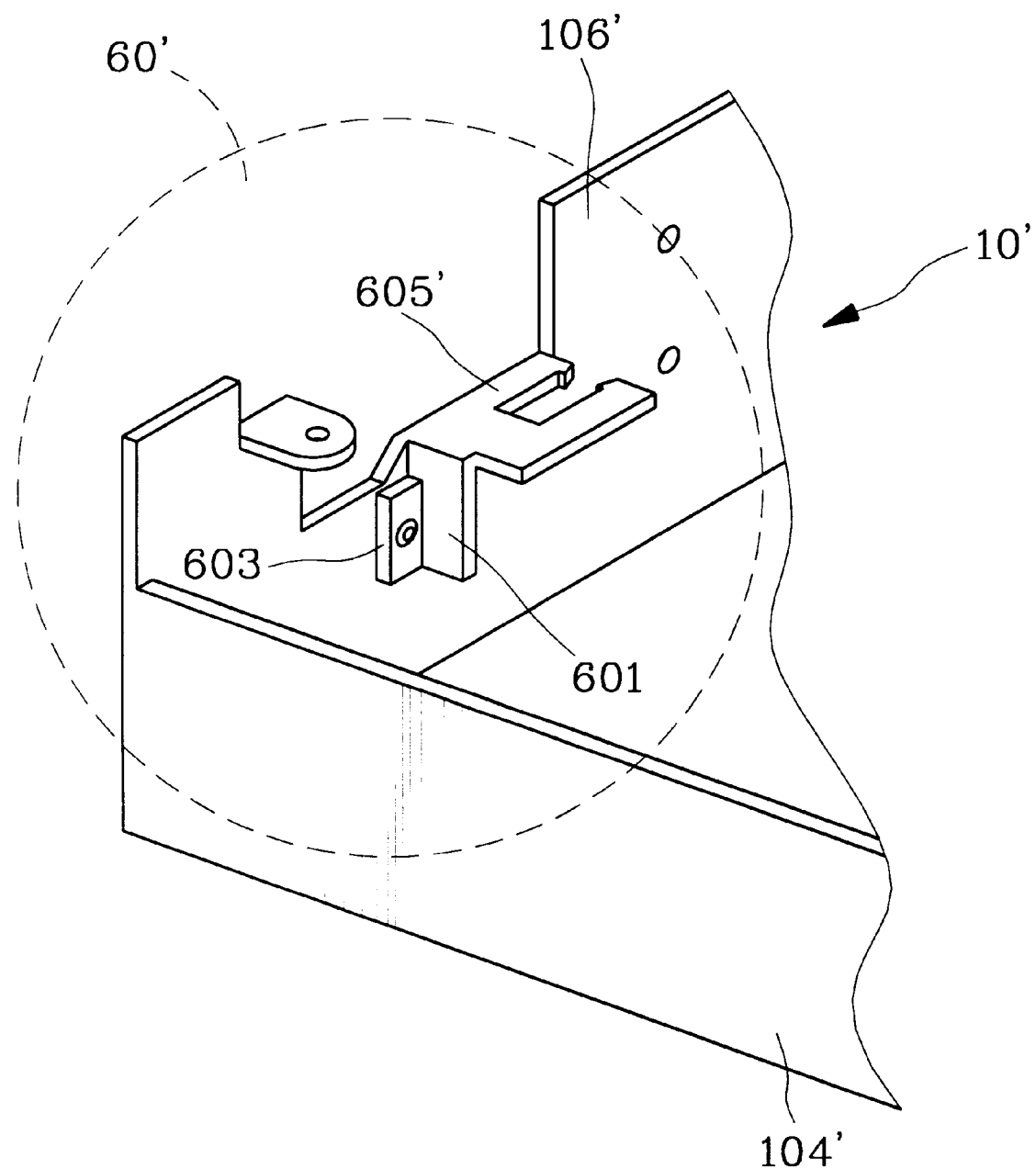
FIG. 2 is a fragmentary perspective view of a conventional bordering means used in FIG. 1.
Figure 3:
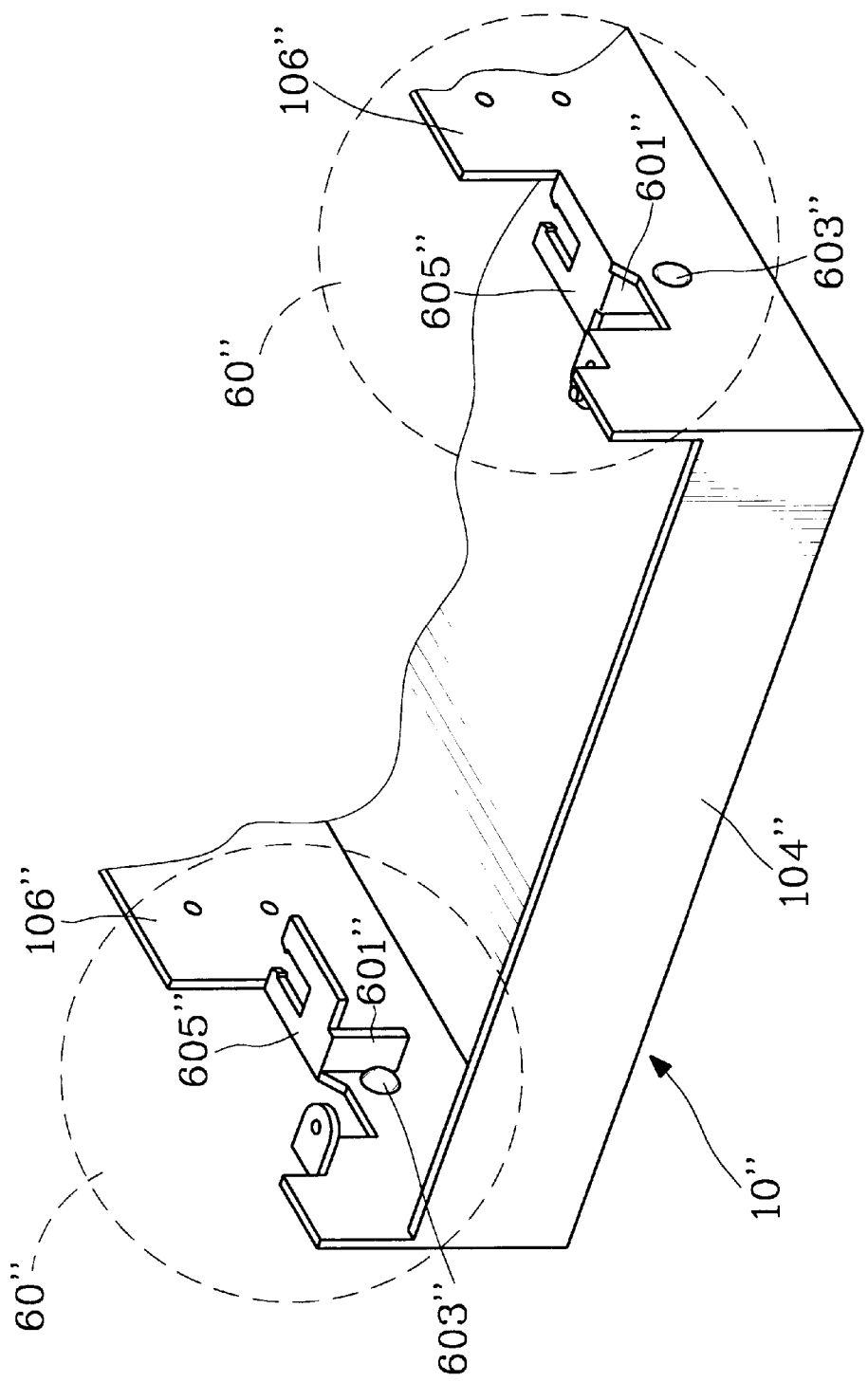
FIG. 3 is a fragmentary perspective view of this invention.

FIG. 3 illustrates a fragmentary perspective view of this invention. The upper case 10" of the CD drive has a rear side 104" and two lateral sides 106". A mounting 60" includes a stopping flange 601" extending inwardly from each lateral side 106", along with a stopper 603" formed in the shape of a bulge adjacent to a rear side of the stopping flange 601" and extending inwardly from the lateral side 106". FIG. 3 shows a preferred embodiment which has the stopping flange 601" integrally formed with a bracket 605" and being bent, preferably 90 degrees, from an edge of the bracket 605". The bracket 605" is also integrally formed from the lateral side 106". The stopping flange 601" has same thickness as the bracket 605", and also has same thickness as the lateral side 106". The stopping flange 601" thus has sufficient mechanical strength to withstand the impact force resulting from transportation and carrying of the CD drive. With stopping flanges 601" located on two opposite lateral sides 106" to hold against the optical disk processing unit, the rearward swaying movement of the optical disk processing unit may be effectively stopped.

According to the present invention, the stopper 603" serves as an additional reinforcement to improve the shock absorbing ability of the stopping flange 601".

The bordering means 60" of this invention is integrally formed with the lateral side 106" of the upper case 10". It may be done by adding a few modifications on the molds and process when manufacturing the CD case. Since these modification do not involve any additional components or trivial assembling, this invention can be implemented with ease and at low cost.

It may thus be seen that the objects of the present invention set forth herein, as well as those made apparent from the foregoing description, are efficiently attained. While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A case mounting for an externally suspended CD drive system including an optical disk processing unit and a circuit board comprising:

a) a casing enclosing the optical disk processing unit and the circuit board, the casing having first and second cases attached together; and, b) a rear side and opposite lateral sides on at least one of the first and second cases, each lateral side having: an integral bracket portion bent so as to extend toward the opposite lateral side, each integral bracket portion having a stopping flange extending therefrom, the stopping flanges located so as to prevent movement of the optical disk processing unit toward the rear side relative to the casing; and an integral protruding bulge unitarily formed from its respective lateral side, adjacent to the stopping flange so as to prevent movement of the stopping flange toward the rear side.

2. The case mounting of claim 1, wherein the stopping flanges extend at an angle of 90° from the bracket portion.

3. The case mounting of claim 1 wherein the lateral side, the bracket portion and the stopping flange all have the same thickness.

* * * * *